United States Patent [19]

Whitley et al.

[11] 4,181,348

[45] Jan. 1, 1980

[54] TRUNK-MOUNTABLE CAMPER CAPSULE FOR AUTOMOBILES

[76] Inventors: William N. Whitley, 19315 Shaker Blvd.; James M. Whitley, 2963 Morley, both of Shaker Heights, Ohio 44122

[21] Appl. No.: 880,083

[22] Filed: Feb. 22, 1978

[51] Int. Cl.² .............................................. B60P 3/30
[52] U.S. Cl. ................ 296/165; 224/42.01; 296/26
[58] Field of Search ................ 296/23 R, 23 MC, 26, 296/27; 224/42.01

[56] References Cited

U.S. PATENT DOCUMENTS

| | | | |
|---|---|---|---|
| 2,493,368 | 1/1950 | Smecker | 296/26 |
| 2,567,104 | 9/1951 | Di Fonzo | 224/42.01 |
| 2,614,882 | 10/1952 | Cook | 296/23 |
| 2,907,077 | 10/1959 | Pugsley | 296/159 |
| 3,326,594 | 6/1967 | Van Atta | 296/23 |
| 3,337,259 | 8/1967 | Henson | 296/23 |

*Primary Examiner*—Philip Goodman
*Attorney, Agent, or Firm*—Burge & Porter Co.

[57] ABSTRACT

A lightweight camper capsule for automobiles is releasably mountable about trunk portions of an automobile without requiring the formation of holes in the automobile body, whereby the watertight integrity of the automobile trunk compartment is maintained. A pivotal connection is established between the camper capsule and the rear bumper of the automobile, and a pair of body mounts are provided at opposite sides of the trunk lid opening. The body mounts are releasable to permit rearward pivoting of the camper capsule to provide access to the automobile's trunk compartment. The camper capsule is provided with a unique lightweight frame having rearwardly and sidewardly facing corner windows enhancing visibility. Provided within the capsule is an elongate seat overlying the automobile trunk lid and a foldable cot extension which normally lies along the front of the seat at a position rearwardly of the automobile's trunk compartment, the cot being foldable upwardly to cooperate with the seat in defining a two passenger bed. When the cot is in its bed-forming position, the floor portion of the capsule located below the cot provides a sleeping compartment for a third person.

19 Claims, 17 Drawing Figures

FIG. 17

TRUNK-MOUNTABLE CAMPER CAPSULE FOR AUTOMOBILES

CROSS-REFERENCE TO RELATED APPLICATION

VEHICLE-SUPPORTED SHELTER, Design Patent Application Ser. No. 880,319 filed (concurrently herewith, by William N. Whitley and James M. Whitley.

BACKGROUND OF THE INVENTION

1. Field of the Invention

The present invention relates generally to a trunk-mountable camper capsule for automobiles and, more particularly, to a novel and improved, lightweight camper capsule which can be removably mounted about trunk portions of an automobile to provide accommodations for three persons while permitting ready access to the trunk of the automobile.

2. Prior Art

While proposals have been made for various types of shelters adapted for attachment to portions of automobiles, most such proposals have suffered one or more of the following drawbacks:

(A) the proposed structures have been relatively massive, both in size and weight, and, in many instances, have required specialized equipment to effect their mounting on and removal from an automobile;

(B) where the proposed structures have been of sufficiently large size to accommodate a plurality of persons, the weight of these units has undesirably affected the driving characteristics of the automobile, and, in some instances, has required the installation of special suspension system equipment and/or the use of additional wheels to support the structures;

(C) where proposed shelter structures have been designed for mounting over the trunk of a vehicle, they have either required removal of the trunk lid in order to permit the use of the trunk space or have been mounted at distances sufficiently removed from the trunk lid to permit its opening, or have prohibited access to the trunk; and, (D) many proposals for automobile-mounted shelters have required the installation of fasteners through the body of the car and have thereby destroyed the watertight integrity of the trunk and/or passenger compartment.

In some instances, proposed shelters adapted for trunk mounting have, themselves, occupied the vast majority of the trunk space and have thereby prohibited the normal use of the trunk compartment.

Still another problem encountered with many proposals for automobile-mounted shelters is that the shelters are difficult to store in a garage stall in such a manner as will permit normal use of the stall by an automobile. Where proposed shelters have been storable in a garage stall without inhibiting normal use of the stall by an automobile, most have required relatively elaborate stands or guy-wire systems to support the shelters above the garage floor or in a suspended attitude from the garage ceiling.

While many proposals have been made for automobile-mounted shelters of various types, the need has gone unanswered for a relatively simple and inexpensive, easy to install, easy to store, lightweight camper capsule which does not prohibit effective use of the trunk space of an automobile.

SUMMARY OF THE INVENTION

The present invention overcomes the foregoing and other drawbacks of the prior art by providing a novel and improved trunk-mountable camper capsule for automobiles which is light in weight, which will accommodate a plurality of persons, which can be installed on an automobile, removed and stored with ease, and which does not prevent normal storage use of an automobile trunk compartment.

Moreover, the present invention provides a novel and improved camper capsule which is adapted for use with a wide variety of automobile model configurations without requiring the insertion of fasteners through holes formed in the automobile body, whereby the watertight integrity of automobile trunk and passenger compartment is preserved.

In accordance with the preferred practice of the present invention, a trunk-mountable camper capsule includes a compartment-defining means and a mounting system for mounting the compartment-defining means about trunk portions of an automobile. The compartment-defining means includes an upstanding frame having spaced sidewalls with top and bottom walls extending transversely between and interconnecting the side walls to define four walls of a "primary" compartment adapted to be positioned rearwardly of the trunk compartment of an automobile. The compartment-defining means also includes a forwardly-extending structure having spaced side walls with top and bottom walls extending transversely therebetween and interconnecting these side walls to define four walls of a "secondary" compartment adapted to overlie the trunk compartment of an automobile. The upstanding frame includes a forwardly-facing wall which interconnects the two bottom walls, and a rear wall interconnecting the frame's side, top and bottom walls. The forwardly-extending structure includes a front wall interconnecting the structure's side, top and bottom walls. The side walls and the top walls of the frame and of the structure are rigidly interconnected to communicate the primary and secondary compartments, whereby a single, large, habitable area is defined within the capsule.

In preferred practice, the upstanding frame and the forwardly-extending structure are formed from a durable, lightweight material such as resin-impregnated glass fibers. The frame and the structure may be formed as separate units and then joined using conventional glass fiber bonding techniques, or may be formed as an integral unit in a single manufacturing operation. In either event, the primary and secondary compartments defined by the frame and the structure are communicated to form a single, large, watertight, habitable area. Where lightweight materials such as resin-impregnated glass fibers are used, the entire camper capsule preferably has a weight of no more than 150 pounds.

The mounting system includes a bumper mount for releasably pivotally mounting the upstanding frame on the bumper of an automobile, and a body mounting system for releasably attaching the forwardly-extending structure to automobile body portions near the trunk lid opening. When the body mounting system is released, the capsule may be pivoted rearwardly about the bumper mount to a position where it is out of the path of movement of the automobile's trunk lid thereby providing ready access to the automobile's trunk compartment.

The capsule provides sleeping accommodations for three adults. The bottom wall of the forwardly-extending structure extends substantially horizontally when the capsule is mounted about the trunk compartment of an automobile, and provides a first bed platform adapted to sleep a first adult lying transversely thereon. A cot is movable from a storage position located along one of the walls of the primary compartment to a sleeping position extending through the primary compartment between the side walls thereof and between the rear and forwardly-facing walls thereof to provide a second bed platform adapted to sleep a second adult lying transversely thereon. The second bed platform defined by the cot is preferably located contiguously with the fist bed platform whereby two adults can sleep side-by-side on the first and second bed platforms. The forwardly-facing wall, the bottom wall, the rear wall, and the side walls of the frame cooperate to define a region located below the cot when the cot is in its sleeping position, this region being of sufficient size to sleep a third adult lying transversely therein.

Provided within the camper are cushions which are movable between a sleeping position overlying the contiguously extending first and second bed platforms, and a seating position overlying portions of both the first bed platform and the front wall. The front wall is inclined slightly forwardly as it extends from the bottom wall to the top wall of the forwardly-extending structure to provide a support for the movable cushions which will orient the cushions in a comfortable attitude to serve as a backrest for persons seated on the cushion-covered portion of the bottom wall structure. Also preferably provided within the capsule are removable platforms carrying a cooking unit and a wash basin. These platforms are removably positionable along side walls of the frame structure.

The capsule is provided with a door and with several windows. A door is pivotally mounted on the rear wall of the capsule. Forwardly and rearwardly facing windows are provided in the front wall and in the door. Rearwardly and sidewardly facing corner windows are provided at junctures of the side and rear walls of the frame structure.

The camper capsule is readily mountable about trunk portions of an automobile by first attaching a portion of the bumper mount to the bumper of an automobile, and by then positioning the camper in a tilted attitude (while still supported on a ground surface) with camper-carried portions of the bumper mount positioned adjacent the bumper-carried portions of the bumper mount. Two connector pins are then inserted to connect the camper-carried and the bumper-carried portions of the bumper mount, and the camper is then pivoted about the bumper mount to bring its body mounts into position along opposite sides of the trunk lid where they are secured. The body mounts are configured to be received between the trunk lid and automobile body portions defining the trunk lid opening, whereby no holes need be formed in the automobile body portions and the watertight integrity of the trunk compartment is thereby maintained.

The camper capsule is removed from an automobile by reversing the mounting process. By virtue of the capsule's relatively lightweight construction, it can be supported or suspended in a garage stall with relative ease in a position which will not inhibit normal automobile use of the stall.

As will be apparent from the foregoing summary, it is an object of the present invention to provide a novel and improved, trunk-mountable camper capsule for automobiles.

It is a further object of the present invention to provide a novel and improved, trunk-mountable camper capsule which is light in weight and which is adapted for use with a wide variety of automobile model configurations without preventing normal use of their trunk compartments.

It is a further object of the present invention to provide a novel and improved, trunk-mountable camper capsule which will accommodate three adults.

These and other objects and a fuller understanding of the invention described in the present application may be had by referring to the detailed description and the claims in conjunction with the accompanying drawings.

BRIEF DESCRIPTION OF THE DRAWING

FIG. 15 is an enlarged exploded perspective view of a pivotal mounting system used to connect the camper capsule to an automobile bumper;

FIG. 16 is a sectional view as seen from a plane indicated by a line 16—16 in FIG. 1 of a body mounting system used to connect the camper capsule to an automobile body in the vicinity of the automobile's trunk lid; and, FIG. 17 is a perspective view of a mounting bracket used in the body mounting system of FIG. 16.

DESCRIPTION OF THE PREFERRED EMBODIMENT

Figures 1, 2, 3:
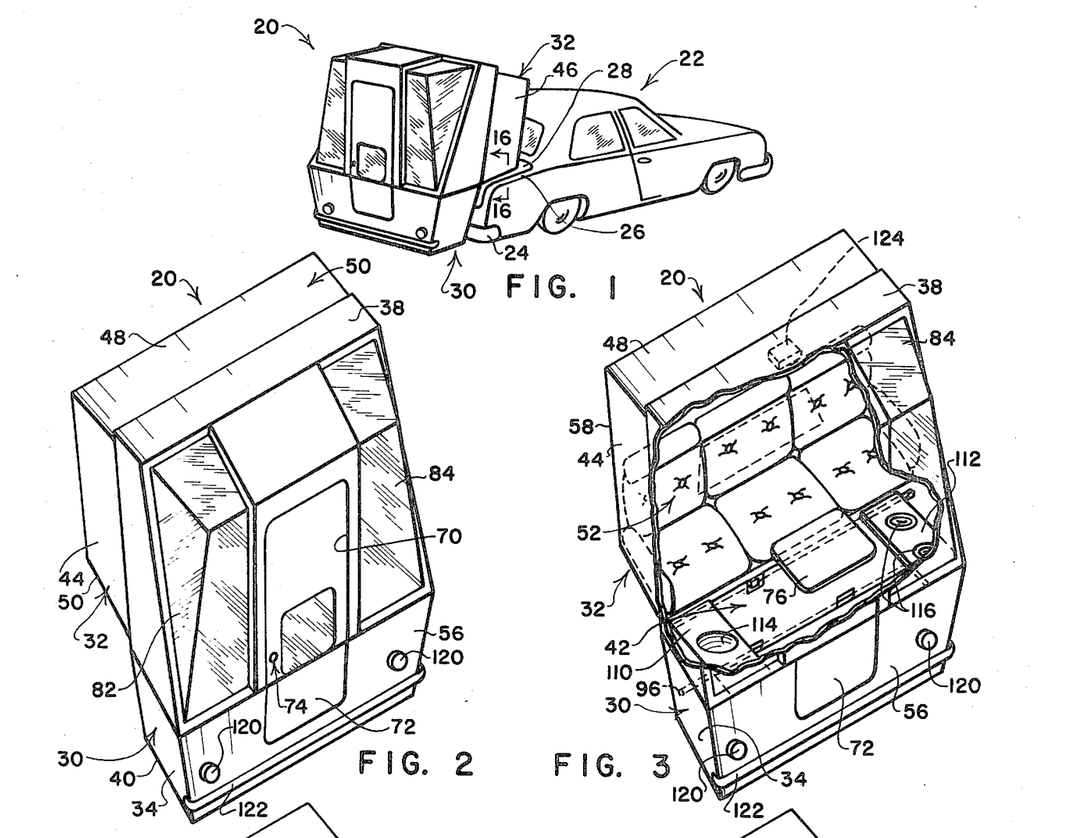
FIG. 1 is a perspective view of a camper capsule embodying the preferred practice of the present invention, the capsule being shown installed about trunk portions of an automobile.
FIG. 2 is an enlarged perspective view of the camper capsule of FIG. 1.
FIGS. 3, 4 and 5 are perspective views similar to FIG. 2 with portions thereof broken away to illustrate interior features of the camper capsule.

Referring to FIG. 1, a trunk-mountable camper capsule embodying the preferred practice of the present invention is indicated generally by the numeral 20. The camper capsule 20 is shown mounted about trunk portions of an automobile 22. As will be explained, the camper capsule 20 is pivotally connected to a rear bumper 24 of the automobile 22 and is releasably attached to body portions 26 located on opposite sides of the automobile'trunk lid 28.

Referring to FIGS. 1 and 2, and to FIGS. 6–11, the camper capsule 20 includes an upstanding frame 30 and a forwardly-extending structure 32. The upstanding frame 30 has side walls 34, 36 and top and bottom walls 38, 40. The four walls 34, 36, 38, 40 surround what may be thought of as a "primary" compartment 42 which is positioned rearwardly of the trunk compartment of the automobile 22. The forwardly-extending structure 32 has side walls 44, 46 and top and bottom walls 48, 50. The four walls 44, 46, 48, 50 surround what may be thought of as a "secondary" compartment 52 which overlies the trunk lid 28. The upstanding frame 30 has a forwardly-facing wall 54 which interconnects the side walls and the two bottom walls 34, 36, 40, 50, and has a rear wall 56 which interconnects the side walls and the top and bottom walls 34, 36, 38, 40. The forwardly-extending structure 32 has a front wall 58 which interconnects the side walls and the top and bottom walls 44, 46, 48, 50. The side walls 34, 44 and 36, 46, and the top walls 38, 48 are rigidly interconnected along their lines of juncture and thereby communicate the primary and secondary compartments 42, 52 to form a single, large, watertight, habitable enclosure suitable for accommodating travel and sleeping needs of three adults.

In preferred practice, the upstanding frame 30 and the forwardly extending structure 32 are formed from a durable, lightweight material such as resin-impregnated glass fibers. The frame 30 and the structure 32 may be formed as separate units and then joined using conventional glass fiber bonding techniques, or may be formed as an integral unit in a single manufacturing operation. In either event, the bottom walls 40, 50 are preferably lined internally with reinforcing materials such as sheets of plywood, indicated by the numerals 60, 62 in FIG. 11. The reinforcing sheets 60, 62 are preferably covered with carpet or fabric, not shown.

Figure 11:
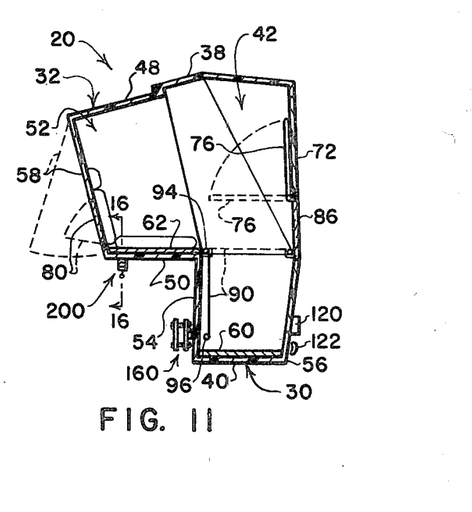
FIG. 11 is a sectional view as seen from a plane indicated by a line 11—11 in FIG. 6, with the movement of optionally extensible portions of the camper capsule being indicated in phantom.

Referring to FIG. 2, a door opening 70 is provided in the rear wall 56. The door opening 70 is substantially rectangular and extends the majority of the height of the rear wall 56. A door 72 is pivotally mounted on the rear wall 56 for selectively opening and closing the door opening 70. A conventional lockable door latch 74 is provided for retaining the door 72 in its closed position. As is best seen in FIG. 11, a fold-down table 76 is pivotally mounted on the inside of the door 72. The table 76 normally assumes its storage position shown in solid lines and is pivotally movable to an extended position shown in phantom in FIG. 11 and shown in solid lines in FIG. 3.

Figure 7:
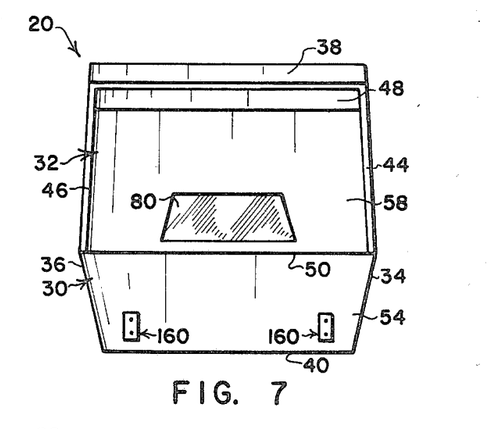
Figure 14:
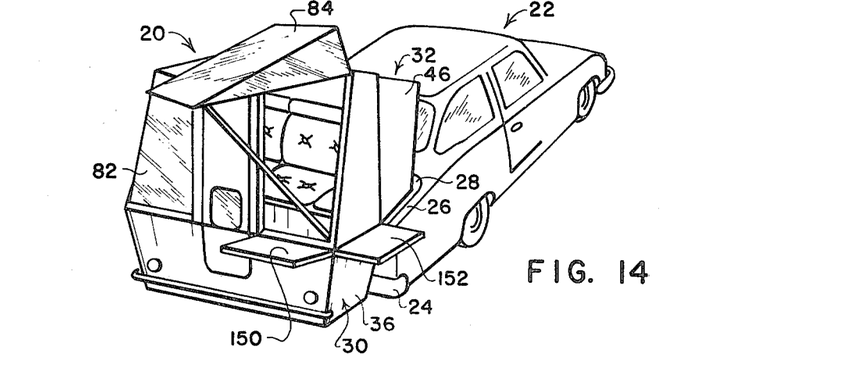
FIG. 14 is a perspective view similar to FIGS. 12 and 13 showing other optional features of the camper capsule.

Several windows are provided in camper capsule 20. A front window 80 is provided in the front wall 58, as best seen in FIG. 7. The front window 80 may be mounted to permit pivotal opening movement, as shown in phantom in FIG. 11. A pair of upstanding corner windows 82, 84 are provided at junctures of the rear and side walls 56, 34, 36. The corner windows 82, 84 may be mounted to permit pivotal opening movement, as illustrated in FIG. 14 where the window 84 is shown pivoted open. A rear window 86 is provided in the door 72 at a location below the table 76.

Referring to FIG. 11, the plywood-reinforced bottom wall 50 forms a substantially horizontal platform having a width and length which will permit its serving as both a seat and as a bed. The front wall 58 inclines forwardly as it extends from the bottom wall 50 to the top wall 48, and thereby provides an inclined backrest for persons seated on the plywood-reinforced bottom wall 50. The front wall 58 may also be formed such that it, or portions of it, can pivot forwardly, as indicated in phantom in FIG. 11, to provide additional sleeping room to accommodate a fourth person and/or to enhance ventilation of the camper capsule 20.

Figure 8:
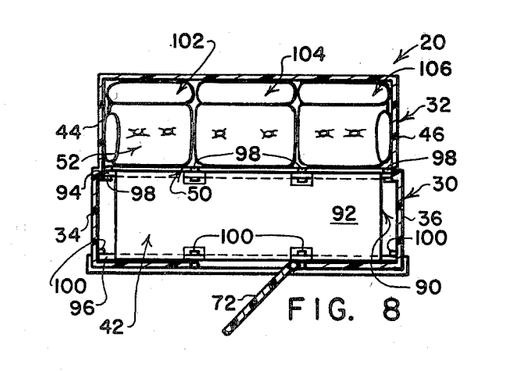
FIG. 8 is a sectional view as seen from a plane indicated by a line 8—8 in FIG. 6.
Figure 9:
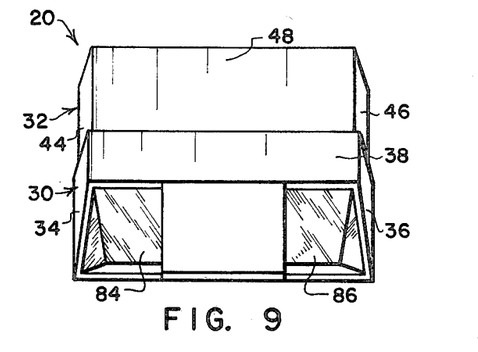
FIG. 9 is a top plan view of the camper capsule.

Referring to FIGS. 8 and 11, a cot 90 is provided for extending the width of the sleeping platform provided by the plywood-reinforced bottom wall 50. The cot 90 includes a flexible fabric member 92 with opposite sides thereof reeved around and secured to two tubular support members 94, 96. Brackets 98 mount the support member 94 such that it extends along the juncture of the bottom and forwardly-facing walls 50, 54. Brackets 100 are provided on the rear wall 56 for releasably receiving portions of the support member 96 for retaining the cot 90 in its sleeping position shown in phantom in FIG. 11 and in solid lines in FIG. 8. The cot 90 is movable to a storage position, shown in solid lines in FIG. 11, simply by disengaging the support member 96 from the brackets 100, whereby the cot 90 pivots downwardly about the axis of the support member 94 to a storage position overlying the forwardly-facing wall 54.

Figure 4:
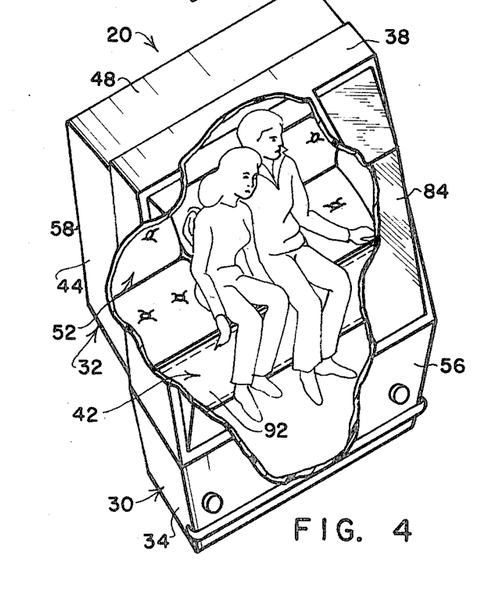
Figure 5:
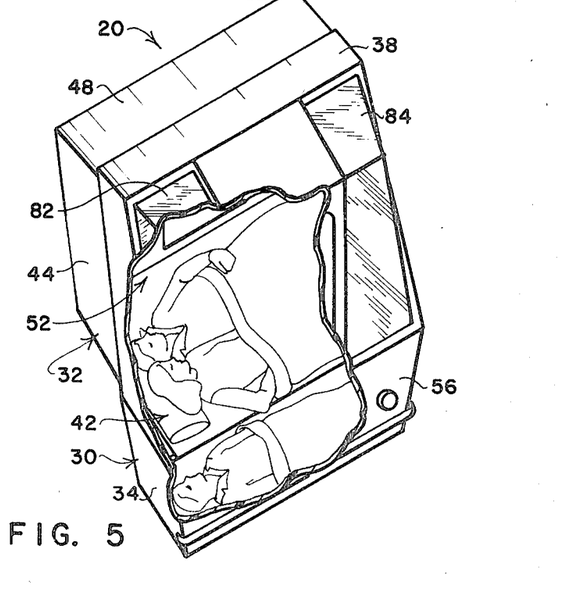
Figure 6:
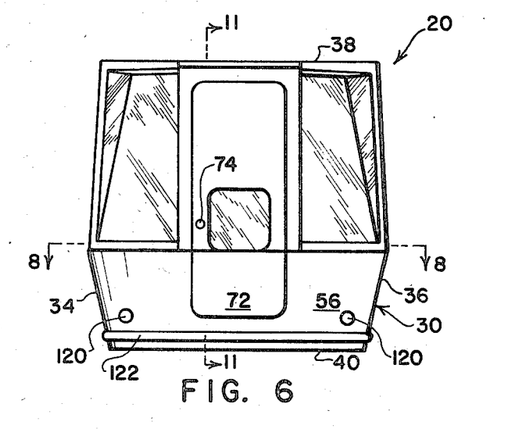
FIGS. 6 and 7 are rear and front elevational views, respectively, of the camper capsule.

Cushions 102, 104, 106 are provided for positioning atop the plywood-reinforced bottom wall 50. For sitting purposes, the cushions 102, 104, 106 may be positioned as shown in FIGS. 3 and 4, overlying portions of the bottom and front walls 50, 58. For sleeping purposes, the cushions 102, 104, 106 may be positioned to overlie portions of the bottom wall and the cot 50, 90, as shown in phantom in FIG. 11, to provide a comfortable bed capable of sleeping two adults side-by-side, as shown in FIG. 5. As is also shown in FIG. 5, the primary compartment portion located below the cot 90, when the cot 90 is in its sleeping position, can sleep a third adult. During transit, the cushions 102, 104, 106 are preferably stored in this lower portion of the primary compartment 42.

Referring to FIG. 3, a pair of platforms 110, 112 may be provided for positioning along the side walls 34, 36. A water basin 114 may be carried in a recess formed in the platform 110. One or more portable cooking units 116 may be carried by the platform 112.

Referring to FIGS. 2 and 3, the rear and side walls 56, 34, 36 of the camper capsule 20 may be provided with suitable taillights 120, bumper formations 122, and such other conventional hardware as may be desired to enhance longevity and safety of operation. An overhead light 124 may be provided inside the top wall 38 to illuminate the interior of the capsule 20.

Figure 12:
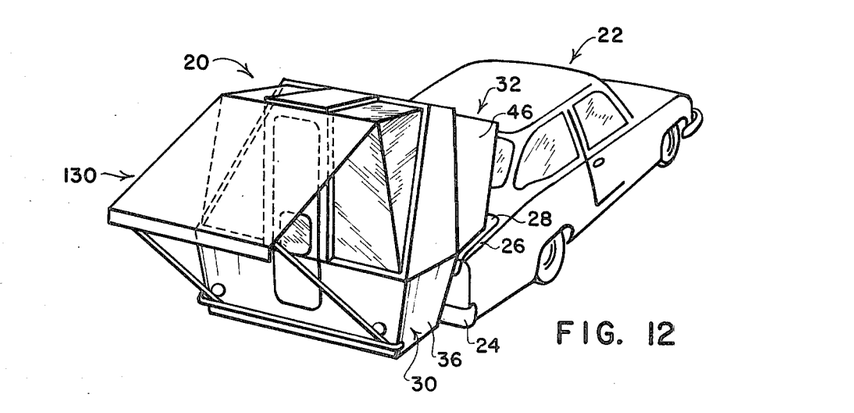
FIGS. 12 and 13 are perspective views of the camper capsule shown with optional shelter extension attachments affixed thereto.
Figure 13:
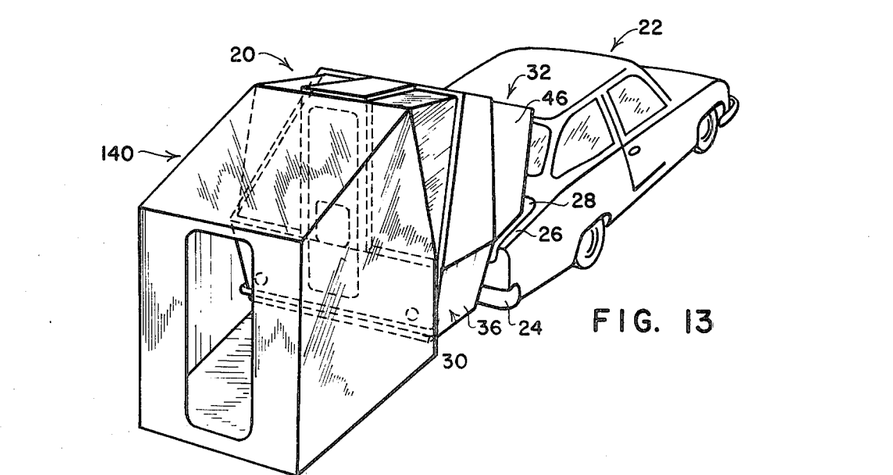

Referring to FIGS. 12, 13 and 14, other optional accessories which may be used with the camper capsule 20 are shown. In FIG. 12, an awning-like accessory is indicated by the numeral 130. In FIG. 13, an auxiliary tent-like enclosure is indicated by the numeral 140. In FIG. 14, auxiliary, removably or pivotally mounted platforms are indicated by the numerals 150, 152. The accessories 130, 140, 150, 152 may be configured for attachment to any of several walls of the capsule 20, as will be readily apparent to those skilled in the art.

Figure 10:
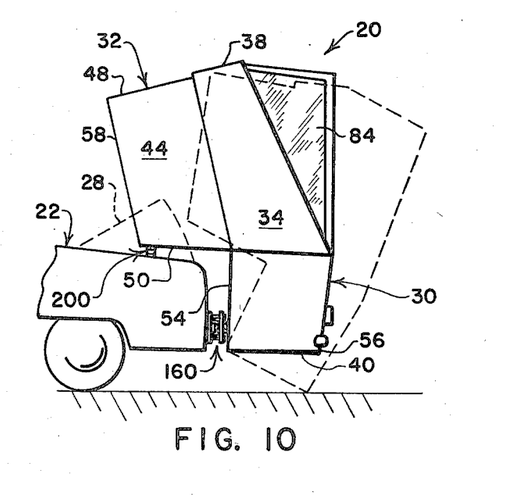
FIG. 10 is a side elevational view of the camper capsule with the normal mounted position of the capsule being shown in solid lines and a rearwardly pivoted position of the capsule being shown in phantom, and with the opening of the automobile's trunk lid also being shown in phantom.

Referring to FIGS. 10 and 11, two types of mounting systems are used to releasably mount the capsule 20 about trunk portions of the automobile 22. A bumper mounting system is indicated generally by the numeral 160. A body mounting system is indicated generally by the numeral 200. Neither of the mounting systems 160, 200 require the formation of holes in body portions of the automobile 22, whereby the watertight integrity of its trunk compartment is maintained.

Figures 15, 16, 17:
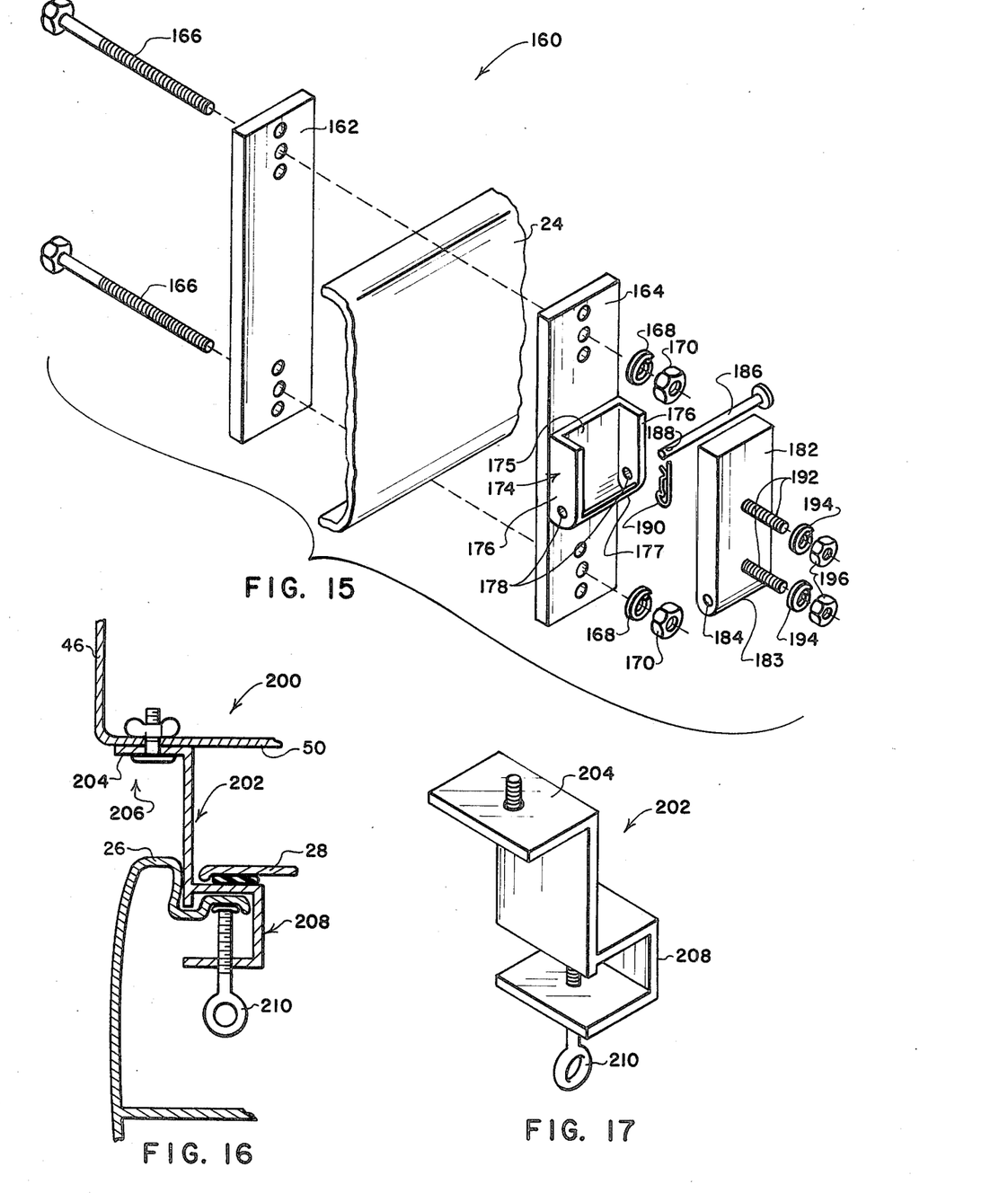

Referring to FIG. 15, one of two identical sets of components which forms the bumper mounting system 160 is shown. These components include forward and rearward upstanding brackets 162, 164 which overlie opposite sides of the automobile bumper 24. The brackets 162, 164 are held in place by bolts 166, lock washers 168 and nuts 170 which operate to clamp the bumper 24 between the brackets 162, 164. On automobiles which will not accommodate a clamp-type mount, the bracket 164 is simply bolted directly to the bumper 24 or clamped thereto using hook-headed bolts, not shown.

A U-shaped member 174 is welded to the bracket 164. The member 174 has a base wall 175, a pair of side walls 176, and an interconnecting curved bottom wall 177. A pair of aligned holes 178 are formed through the side walls 176. A mounting block 182 having a curved bottom wall 183 is provided for positioning between the side walls 176. A hole 184 extends through a lower end region of the mounting block 182. A headed pin 186 is provided for extension through the holes 178, 184 to pivotally connect the mounting block 182 to the U-shaped member 174. A hole 188 is provided in the pin 186. A spring-steel retainer clip 190 is provided for insertion in the hole 188 to hold the pin 186 in place.

A pair of threaded studs 192 are carried by the mounting block 182 and project rearwardly therefrom for extension through holes, not shown, formed in the forwardly-facing wall 54 of the capsule 20. Lock washers 194 and nuts 196 are provided for engaging the studs 192 to securely fasten the mounting block 182 to the camper capsule 20.

Two of the sets of components shown in FIG. 15 are used to form the bumper mounting system 160, and these sets are positioned in spaced relationship on the forwardly-facing wall 54, as best seen in FIG. 7.

A feature of the bumper mounting system 160 is that it provides a pivoted mounting of the camper capsule 20 which will let the capsule 20 pivot rearwardly, as shown in FIG. 10, to a position out of the path of movement of the trunk lid 28. Another feature of the mounting system 160 is that the brackets 162, 164 can be kept mounted on the bumper 24 even when the camper capsule 20 is in storage, whereby reconnecting the components of the bumper mounting system 160 to reestablish connection to the capsule 20 involves nothing more than positioning the capsule 20 to align the holes 178, 184 and installing the pins 186 through the aligned holes 178, 184. The curved bottom wall 183 of the mounting block 182 is receivable within the curved bottom wall 177 of the bracket 164 to facilitate aligning the holes 178, 184 during mounting of the camper capsule 20.

Referring to FIGS. 16 and 17, the body mounting system employs two identical bracket assemblies 202. One of the bracket assemblies 202 is positioned on each side of the automobile trunk lid 28 and is configured to extend between the trunk lid 28 and such portions of the automobile body 26 as overlie side portions of the trunk lid 28.

Each of the bracket assemblies 202 has an upper mounting portion 204 adapted to underlie the bottom wall 50 of the camper capsule 20. A releasable fastener, indicated generally by the numeral 206, is provided for releasably securing the mounting portion 204 to the bottom wall 50. Each of the bracket assemblies 202 has a U-shaped lower mounting portion 208 which carries a threaded clamping member 210. The clamping member 210 is adapted to be tightened to clamp the bracket assembly 202 in place on the car body portion 26 at a location which will not inhibit normal operation of the trunk lid 28.

When the camper capsule 20 is mounted on the automobile 22 as shown in FIG. 1, access to the automobile's trunk compartment is had by releasing the fasteners 206 and pivoting the capsule 20 to the position shown in phantom in FIG. 10. The trunk lid 28 may then be opened.

It is found that the capsule 20 will not significantly alter the driving characteristics of full-size automobiles. When the vehicle is stopped for overnight use, it is desirable to position conventional support stands or blocks beneath the bottom wall 40 to relieve the load on the automobile's suspension system and to assure stable, movement-free support of the capsule 20.

While the cot 90 is described as being formed from flexible fabric, it will be appreciated by those skilled in the art that the cot 90 can comprise a rigid platform. Accordingly, where the term "cot" is used, it is intended to include the use of such structures as a rigid platform.

As will be apparent from the foregoing description, the present invention provides a simple and relatively inexpensive unit which can be mounted with ease on automobiles of a wide variety of configurations to serve the travel and sleeping needs of three adults.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A trunk-mountable camper capsule for automobiles, comprising:
    (a) compartment-defining means, including:
        (i) an upstanding frame having spaced side walls with top and bottom walls extending transversely between and interconnecting its side walls to define four walls of a "primary" compartment adapted to be positioned rearwardly of the trunk compartment of an automobile;
        (ii) a forwardly-extending structure having spaced side walls with top and bottom walls extending transversely between and interconnecting its side walls to define four walls of a "secondary" compartment adapted to overlie the trunk compartment of an automobile;
        (iii) the upstanding frame additionally including a forwardly-facing wall which interconnects the two bottom walls, and a rear wall interconnecting the side walls and the top and bottom walls of the frame;
        (iv) the forwardly-extending structure additionally including a front wall interconnecting the side walls and the top and bottom walls of the structure;
        (v) the side walls and the top walls of the frame and the structure being rigidly interconnected to communicate the "primary" and "secondary" compartments;

(b) mounting means for releasably mounting the camper capsule about the trunk compartment of an automobile with the "primary" compartment positioned along the rear side of the automobile's trunk compartment at a location wherein the forwardly-facing wall is spaced rearwardly of the automobile's rear bumper and with the "secondary" compartment positioned at a location above the automobile's trunk compartment at a location wherein the secondary compartment's bottom wall is spaced above the automobile's trunk lid, the mounting means including bumper mounting means extending forwardly from the forwardly-facing wall for releasably mounting the "primary" compartment on the automobile's rear bumper, and including body mounting means depending from the bottom wall of the forwardly-extending structure for releasably mounting the secondary compartment on the automobile's trunk at locations on opposite sides of the automobile's trunk lid;

(c) the capsule providing means for sleeping two adults, whereby:
 (i) the bottom wall of the forwardly-extending structure extends substantially horizontally when the capsule is mounted about the trunk compartment of an automobile, and provides a first bed platform adapted to sleep a first adult lying transversely thereon;
 (ii) a cot means is provided within the compartment-defining means including structure movable between a storage position located along one of the walls of the compartment-defining means and a sleeping position extending through the "primary" compartment between the side walls and the rear and forwardly-facing walls thereof to provide a second bed platform adapted to sleep a second adult lying transversely thereon.

2. The camper capsule of claim 1 wherein the forwardly-facing wall, the bottom wall, the rear wall, and the side walls of the frame cooperate to define a region located below the cot means when the cot means is in its sleeping position, the region being of sufficient size to sleep a third adult lying transversely therein.

3. A trunk-mountable camper capsule for automobiles, comprising:
(a) compartment-defining means, including:
 (i) an upstanding frame having spaced side walls with top and bottom walls extending transversely between and interconnecting its side walls to define four walls of a "primary" compartment adapted to be positioned rearwardly of the trunk compartment of an automobile;
 (ii) a forwardly-extending structure having spaced side walls with top and bottom walls extending transversely between and interconnecting its side walls to define four walls of a "secondary" compartment adapted to overlie the trunk compartment of an automobile;
 (iii) the upstanding frame additionally including a forwardly-facing wall which interconnects the two bottom walls, and a rear wall interconnecting the side walls and the top and bottom walls of the frame;
 (iv) the forwardly-extending structure additionally including a front wall interconnecting the side walls and the top and bottom walls of the structure;
 (v) the side walls and the top walls of the frame and the structure being rigidly interconnected to communicate the "primary" and "secondary" compartments;

(b) mounting means for releasably mounting the camper capsule about the trunk compartment of an automobile with the "primary" compartment positioned rearwardly of the trunk compartment and with the "secondary" compartment overlying the trunk compartment;

(c) the capsule providing means for sleeping two adults, whereby:
 (i) the bottom wall of the forwardly-extending structure extends substantially horizontally when the capsule is mounted about the trunk compartment of an automobile, and provides a first bed platform adapted to sleep a first adult lying transversely thereon;
 (ii) a cot means is provided within the compartment-defining means including structure movable between a storage position located along one of the walls of the compartment-defining means and a sleeping position extending through the "primary" compartment between the side walls and the rear and forwardly-facing walls thereof to provide a second bed platform adapted to sleep a (d) support means for positioning and supporting the cot means to extend substantially coplanarly with the bottom wall of the forwardly-facing structure, whereby the first and second bed platforms extend substantially contiguously.

4. The camper capsule of claim 3 additionally including cushion means movable between a sleeping position overlying the contiguously extending bed platforms, and a seating position overlying the first bed platform and the front wall.

5. The camper capsule of claim 4 wherein the front wall is inclined slightly forwardly as it extends from the bottom wall to the top wall of the forwardly-extending structure to provide a support for the cushion means when the cushion means is in its seating position, which support will orient the cushion means in a comfortable attitude to serve as a backrest for persons seated on the cushion portion overlying the bottom wall of the forwardly-extending structure.

6. The camper capsule of claim 1 additionally including a plurality of window openings formed through selected walls of the compartment-defining means, and windows extending across the window openings.

7. The camper capsule of claim 6 wherein at least one of the windows is pivotally mounted for movement between positions selectively opening and closing its window opening.

8. A trunk-mountable camper capsule for automobiles, comprising:
(a) compartment-defining means, including:
 (i) an upstanding frame having spaced side walls with top and bottom walls extending transversely between and interconnecting its side walls to define four walls of a "primary" compartment adapted to be positioned rearwardly of the trunk compartment of an automobile;
 (ii) a forwardly-extending structure having spaced side walls with top and bottom walls extending transversely between and interconnecting its side walls to define four walls of a "secondary" compartment adapted to overlie the trunk compartment of an automobile;
(iii) the upstanding frame additionally including a forwardly-facing wall which interconnects the two bottom walls, and a rear wall interconnecting the side walls and the top and bottom walls of the frame;
(iv) the forwardly-extending structure additionally including a front wall interconnecting the side walls and the top and bottom walls of the structure;
(v) the side walls and the top walls of the frame and the structure being rigidly interconnected to communicate the "primary" and "secondary" compartments;
(b) mounting means for releasably mounting the camper capsule about the trunk compartment of an automobile with the "primary" compartment positioned rearwardly of the trunk compartment and with the "secondary" compartment overlying the trunk compartment;
(c) the capsule providing means for sleeping two adults, whereby:
(i) the bottom wall of the forwardly-extending structure extends substantially horizontally when the capsule is mounted about the trunk compartment of an automobile, and provides a first bed platform adapted to sleep a first adult lying transversely thereon;
(ii) a cot means is provided within the compartment-defining means including structure movable between a storage position located along one of the walls of the compartment-defining means and a sleeping position extending through the "primary" compartment between the side walls and the rear and forwardly-facing walls thereof to provide a second bed platform adapted to sleep a second adult lying transversely thereon; and,
(d) a plurality of window openings formed through selected walls of the compartment-defining means, and windows extending across the window openings, the window openings including a pair of corner window openings defined at junctures of the rear and side walls of the primary compartment, and the windows including a pair of corner windows closing these corner window openings.

9. A trunk-mountable camper capsule for automobiles, comprising:
(a) compartment-defining means, including:
(i) an upstanding frame having spaced side walls with top and bottom walls extending transversely between and interconnecting its side walls to define four walls of a "primary" compartment adapted to be positioned rearwardly of the trunk compartment of an automobile;
(ii) a forwardly-extending structure having spaced side walls with top and bottom walls extending transversely between and interconnecting its side walls to define four walls of a "secondary" compartment adapted to overlie the trunk compartment of an automobile;
(iii) the upstanding frame additionally including a forwardly-facing wall which interconnects the two bottom walls, and a rear wall interconnecting the side walls and the top and bottom walls of the frame;
(iv) the forwardly-extending structure additionally including a front wall interconnecting the side walls and the top and bottom walls of the structure;
(v) the side walls and the top walls of the frame and the structure being rigidly interconnected to communicate the "primary" and "secondary" compartments;
(b) mounting means for releasably mounting the camper capsule about the truck compartment of an automobile with the "primary" compartment positioned rearwardly of the trunk compartment and with the "secondary" compartment overlying the trunk compartment;
(c) the capsule providing means for sleeping two adults, whereby:
(i) the bottom wall of the forwardly-extending structure extends substantially horizontally when the capsule is mounted about the trunk compartment of an automobile, and provides a first bed platform adapted to sleep a first adult lying transversely thereon;
(ii) a cot means is provided within the compartment-defining means including structure movable between a storage position located along one of the walls of the compartment-defining means and a sleeping position extending through the "primary" compartment between the side walls and the rear and forwardly-facing walls thereof to provide a second bed platform adapted to sleep a second adult lying transversely thereon; and,
(d) the mounting means additionally including body mounting means engagable with the automobile body portions near the trunk lid opening for releasably attaching the forwardly-extending structure thereto; and,
(e) the body mounting means including a pair of brackets adapted to extend between the body portions and the trunk lid for connection to the body portions without requiring the formation of holes in the body portions and without disturbing the watertight integrity of the trunk compartment.

10. The camper capsule of claim 1 wherein a door opening is provided in the rear wall, and a pivotally mounted door is provided for selectively opening and closing the door opening.

11. The camper capsule of claim 10 wherein table means is foldably carried on the interior of the door, the table means being movable between a storage position overlying interior portions of the door, and an extended position projecting into the "primary" compartment.

12. The camper capsule of claim 1 additionally including platform-defining means and positioning means for supporting the platform-defining means at a position extending along one of the side walls of the frame.

13. The camper capsule of claim 8 additionally including a cooking unit supported by the platform-defining means.

14. The camper capsule of claim 8 additionally including a wash basin supported by the platform-defining means.

15. The camper capsule of claim 8 wherein at least one of the walls of the compartment-defining means is provided with a pivotally mounted portion movable between a transport position lying alongside surrounding portions of its associated wall, and an extended position pivoted outwardly therefrom.

16. The camper capsule of claim 8 additionally including a removable, rearwardly extensible shelter structure adapted to be supported, at least in part, by the compartment-defining means.

17. The camper capsule of claim 8 wherein the mounting means includes bumper mounting means for releasably attaching the capsule to the bumper of an automobile.

18. The camper capsule of claim 17 wherein the bumper mounting means is operable to establish a pivotal connection between the capsule and the bumper which will permit the capsule to be pivoted rearwardly out of the path of movement of the automobile's trunk lid.

19. The camper capsule of claim 17 wherein the mounting means additionally includes body mounting means engagable with the automobile body portions near the trunk lid opening for releasably attaching the forwardly-extending structure thereto.

* * * * *